R. H. POOLER & W. T. JONES.
WIRE FENCE-BARB FORMER.

No. 174,435. Patented March 7, 1876.

WITNESSES:
John Goethals
Alfred Lurcott

INVENTOR:
R. H. Pooler and
BY W. T. Jones

ATTORNEYS.

UNITED STATES PATENT OFFICE.

RHEUBIN H. POOLER AND WILLIAM T. JONES, OF SERENA, ILLINOIS.

IMPROVEMENT IN WIRE-FENCE-BARB FORMERS.

Specification forming part of Letters Patent No. 174,435, dated March 7, 1876; application filed January 15, 1876.

*To all whom it may concern:*

Figure 1:
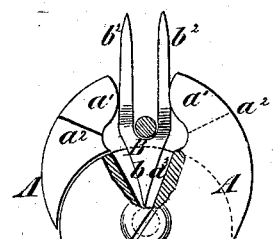
Figure 3:
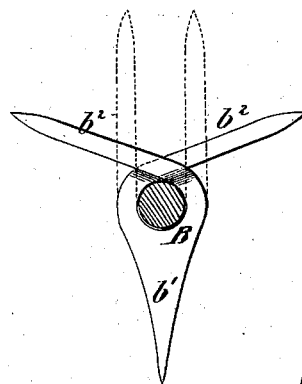
Figure 4:
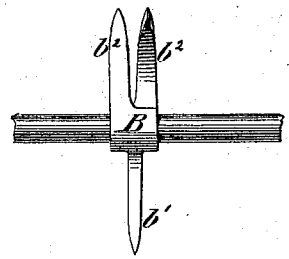
Figure 2:
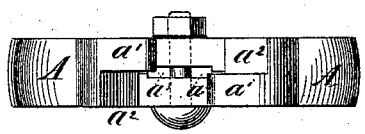

Be it known that we, RHEUBIN H. POOLER and WILLIAM T. JONES, of Serena, La Salle county, Illinois, have invented a new and useful Improvement in Pinchers for Applying Barbs to Wire Fences, of which the following is a specification:

Figure 1 is a side view of our improved pinchers, part being broken away to show the construction, and showing a barb in place ready to be applied to a wire. Fig. 2 is an end view of the pinchers. Fig. 3 represents a barb applied to a wire. Fig. 4 is a side view of the same.

Similar letters of reference indicate corresponding parts.

The object of this is to furnish an improvement in applying three-pronged barbs to the wires of wire fences, to enable them to be easily and quickly applied to the wires, and in such a way that they will be strongly and firmly secured and will not be liable to become loose or fall or be knocked off.

The invention consists in the pinchers made with the halved jaws, the shoulders, and the angular socket, to adapt them for applying three-pronged barbs to fence-wires.

A are the pinchers, which are made in two parts pivoted to each other in the usual way, and the jaws $a^1$ of which are halved upon their opposite sides, so that they may pass each other, and so that each jaw may have a shoulder, $a^2$, for the other jaw to force a prong of a barb down against.

The faces of the jaws are concaved, so as when forced together to leave a cavity or hole to receive the fence-wire. The inner sides of the inner parts of the jaws are recessed or have triangular notches $a^3$ in them, the notches $a^3$ of the two jaws forming a triangular socket to receive the third prong of the barb. B are the barbs, which may be cast of malleable iron or cut out or forged in a drop-press, with a single prong, $b^1$, upon one side, and two parallel prongs, $b^2$, upon the other side, as shown in dotted lines in Fig. 3. The two parallel prongs $b^2$ of the barbs B should be made with a slight offset, in opposite directions, to bring them into line with the jaws $a^1$ of the pinchers A.

In applying the barbs, the single prong $b^1$ is inserted in the cavity $a^3$ of the pinchers A, with the outer side of each parallel prong $b^2$ resting against a jaw, $a^1$, of said pinchers.

The barb B and pinchers A are then made to straddle the fence-wire, as shown in Fig. 1, and the pinchers are closed, which forces the parallel prongs across the wire in opposite directions, as shown in Figs. 3 and 4. The pinchers are then opened and removed, leaving the barb firmly attached to the wire.

Having thus described our invention, we claim as new and desire to secure by Letters Patent—

The pinchers A, made with the halved jaws $a^1$, the shoulders $a^2$, and the triangular socket $a^3$, to adapt them for applying three-pronged barbs to the fence-wires, substantially as herein shown and described.

RHEUBIN H. POOLER.
WILLIAM T. JONES.

Witnesses:
  A. T. ARMSTRONG,
  S. L. PALMER.